(12) United States Patent
Xu et al.

(10) Patent No.: US 10,230,540 B2
(45) Date of Patent: Mar. 12, 2019

(54) METHOD, DEVICE AND SYSTEM FOR COMMUNICATING IN A RING NETWORK

(71) Applicant: Honeywell International, Inc., Morris Plains, NJ (US)

(72) Inventors: Huagang Xu, Shanghai (CN); Haifeng Liang, Shanghai (CN); Lei Zou, Shanghai (CN); Zhi Yang, Shanghai (CN); Junyu Chen, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 162 days.

(21) Appl. No.: 15/177,691

(22) Filed: Jun. 9, 2016

(65) Prior Publication Data

US 2016/0373272 A1 Dec. 22, 2016

Related U.S. Application Data

(63) Continuation of application No. PCT/CN2015/081938, filed on Jun. 19, 2015.

(51) Int. Cl.
*H04L 12/437* (2006.01)
*H04L 12/44* (2006.01)
*H04L 1/24* (2006.01)
*H04L 12/24* (2006.01)

(52) U.S. Cl.
CPC ........... *H04L 12/437* (2013.01); *H04L 1/242* (2013.01); *H04L 12/44* (2013.01); *H04L 41/0659* (2013.01)

(58) Field of Classification Search
None
See application file for complete search history.

(56) References Cited

U.S. PATENT DOCUMENTS

| 2005/0243823 | A1* | 11/2005 | Griswold | H04L 12/437 370/389 |
| 2006/0092856 | A1* | 5/2006 | Mitsumori | H04L 1/22 370/254 |
| 2006/0245351 | A1* | 11/2006 | Pande | H04L 12/1868 370/216 |
| 2010/0020798 | A1 | 1/2010 | Jones | |

(Continued)

OTHER PUBLICATIONS

Micrel, KSZ8873MLL/FLL/RLL—Integrated 3-Port 10/100 Manages Switch with PHYs, Revision 1.6, Sep. 20, 2013, 115 pages, publisher Micrel, Inc., San Jose, CA.

*Primary Examiner* — Kodzovi Acolatse

(57) ABSTRACT

A communication method includes receiving data messages at a specified one of a plurality of communication devices in a ring network and detecting a status of the ring network. The communication method also includes changing a port of the specified communication device from a blocking state to a forwarding state in response to detecting a failure in the ring network. The communication method further includes filtering and forwarding the received data messages in the ring network, where the received data messages that originated from the specified communication device are blocked from further forwarding at the specified communication device. In addition, the communication method includes changing the port of the specified communication device from the forwarding state to the blocking state in response to detecting a recovery of the ring network.

18 Claims, 4 Drawing Sheets

(56) References Cited

U.S. PATENT DOCUMENTS

| | | | |
|---|---|---|---|
| 2010/0226377 A1* | 9/2010 | Ogasahara | H04L 12/437 370/400 |
| 2010/0284416 A1* | 11/2010 | Aoshima | H04L 12/433 370/401 |
| 2012/0263044 A1* | 10/2012 | Akahane | H04L 43/10 370/242 |
| 2012/0294139 A1* | 11/2012 | Arai | H04L 12/185 370/216 |
| 2015/0195102 A1* | 7/2015 | Mochida | H04L 12/437 370/223 |

* cited by examiner

METHOD, DEVICE AND SYSTEM FOR
COMMUNICATING IN A RING NETWORK

CROSS-REFERENCE TO RELATED
APPLICATION AND PRIORITY CLAIM

This application claims priority as a continuation of PCT Patent Application No. PCT/CN2015/081938 filed on Jun. 19, 2015. This PCT application is hereby incorporated by reference in its entirety.

TECHNICAL FIELD

The present invention relates to communication technology in Ethernet, and more particularly to a method, device and system for communicating in a ring network.

BACKGROUND

Communication devices such as those in a monitoring system for a building facility or a plant facility are connected as nodes via a communication network. The communication system such as a monitoring system is typically deployed in an Ethernet network via which nodes communicate with each other according to a set of protocols.

Ring topology has been proposed for connecting each node in the monitoring system for industrial facilities. Compared to a star topology in which each node is connected via separate wiring, a ring topology particularly a single ring configuration alleviates the workload involved with the wiring work and maintenance. A ring network may provide redundant communication paths to avoid communication cut-off in the event of a failure.

FIG. 1 is an example of a configuration of a typical ring network 100 in which nodes are provided with a network control function that performs spanning tree control methods such as Spanning Tree Protocol (STP) and Rapid Spanning Tree Protocol (RSTP). In FIG. 1, the path from node N1 which acts as a master node to node N2 could be either counterclockwise or clockwise. If the cost of the counterclockwise direction is lower than that of the clockwise direction, then the counterclockwise path will be selected as an active communication path 120. Accordingly, the path from the node N2 to node N3 becomes an unnecessary path. One port of nodes on this unnecessary path is blocked to establish a redundant communication path 140. Consequently, a loop configuration is logically prevented by setting a port on the redundant communication path 140 in a blocking state.

In the event that a link between two nodes fails or a node of the ring network malfunctions, the blocked port of the node on that redundant communication path 140 is unblocked in order to establish a new communication path. In the example shown in FIG. 1, if a failure occurs at point P1, node N2 may unblock point P2 to form a new path from node N1 to node N2 through node N3.

However, spanning tree control methods that involve path recalculation may consume considerable computing resources. This may lead to a decrease in system performance and an increase in restoration time of data communication. Also, the amount of time consumed for path recalculation is proportional to the number of the nodes in the ring network so the total number of the nodes may significantly affect the amount of time for switching from a failed path to a new path. Moreover, with spanning tree control methods, the ring network recovered from failure could not activate data communication until each node learns a new communication path notified by the master node.

It is therefore an object of the present invention to address one or more of the above issues.

SUMMARY

According to an aspect of the invention, there is provided a communication method in a ring network comprising a plurality of communication devices, wherein the communication method comprises: detecting the status of the ring network in a first communication device; changing a port of the first communication device from a blocking state to a forwarding state in response to a detection of a failure in the ring network; filtering received data messages in at least one of the plurality of communication devices, wherein forwarding of a data message in a communication device is stopped in response to a determination that the data message originated in the communication device; and changing the port of the first communication device from a forwarding state to a blocking state in response to a detection of a recovery of the ring network.

In the above aspect, the step of detecting the status of the ring network comprises: transmitting periodically a control message from a first port toward a second port of the first communication device; and determining that a failure is detected if the second port fails to receive the control message transmitted from the first port and that a recovery is detected if the second port receives the control message transmitted from the first port.

In the above aspect, the step of filtering received data messages comprises: comparing the source address of a data message with the local address of a communication device that receives the data message; and discarding the data message in response to a determination that the source address of the data message matches the local address of the communication device.

In the above aspect, the source address of the data message and the local address of the communication device is a MAC address or an IP address.

In the above aspect, filtering received data messages is performed in all of the plurality of communication device.

According to another aspect of the invention, there is provided a communication system in a ring network comprising a plurality of communication devices, wherein the communication system comprises: means for detecting the status of the ring network in a first communication device; means for changing a port of the first communication device from a blocking state to a forwarding state in response to a detection of a failure in the ring network; means for filtering received data messages in at least one of the plurality of communication devices, wherein forwarding of a data message in a communication device is stopped in response to a determination that the data message originated in the communication device; and means for changing the port of the first communication device from a forwarding state to a blocking state in response to a detection of a recovery of the ring network.

In the above aspect, means for detecting the status of the ring network comprises: means for transmitting periodically a control message from a first port toward a second port of the first communication device; and means for determining that a failure is detected if the second port fails to receive the control message transmitted from the first port and that a recovery is detected if the second port receives the control message transmitted from the first port.

In the above aspect, means for filtering received data messages comprises: comparing the source address of a data message with the local address of a communication device that receives the data message; and discarding the data message in response to a determination that the source address of the data message matches the local address of the communication device.

According to another aspect of the invention, there is provided a communication device in a ring network comprising: a transmit/receive unit for communicating messages to or from other communication devices; a determination unit for referencing the information in the message received from other communication devices through the transmit/receive unit and determining whether specific information is contained in that message; a central control unit for controlling a port control unit based on the determined result from the determination unit; and the port control unit for controlling the state of the ports in the transmit/receive unit.

In the above aspect, the determination unit is configured to reference the contents of a control message received from other communication devices through the transmit/receive unit and to determine whether a failure has occurred in the ring network, or whether the ring network has been recovered from a failure; and the central control unit is configured to control the port control unit, based on the determined result, to change a port into either a forwarding state or a blocking state.

In the above aspect, the determination unit is further configured to determine whether the source address of a received data message matches the local address of a communication device; and the central control unit is further configured to terminate forwarding of the data message based on the determined result indicating that the data message originated from the communication device. In the above aspect, the communication device is switch.

According to another aspect of the invention, there is provided a communication method in a ring network including a plurality of communication devices, comprising steps of: receiving, at one of the plurality of communication devices, messages in a ring network and detecting status of the ring network; changing a port of the one of the plurality of the communication devices from a blocking state to a forwarding state if a failure in the ring network is detected; filtering and forwarding the received data messages in the ring network, wherein the received data messages that originated from the one of the plurality of communication devices are blocked from further forwarding at the one of the plurality of communication devices; and changing the port of the one of the plurality of communication devices from a forwarding state to a blocking state if a recovery of the ring network is detected. In an example, the step of detecting status of the ring network comprises: transmitting periodically a control message from a first port toward a second port of the one of the plurality of communication devices via the ring network; determining a failure if the second port fails to receive the control message transmitted from the first port; and determining a recovery if the second port receives the control message transmitted from the first port via the ring network. In another example, the step of filtering received data messages comprises comparing the source address of the received data messages with the local address of the one of the plurality of communication devices; and blocking the received data messages based on a determination that the source address of the received data messages matches the local address of the one of the plurality of communication devices.

According to another aspect of the invention, there is provided a communication device in a ring network comprising: a transmit/receive unit for communicating messages to or from other communication devices in the ring network; a determination unit for referencing the information in the messages received from other communication devices through the transmit/receive unit and determining whether certain information is contained in the messages; a port control unit for controlling state of one or more ports in the transmit/receive unit; and a central control unit for controlling the port control unit based on a determination from the determination unit. In an example, the determination unit is configured to reference contents of a control message received from other communication devices through the transmit/receive unit and to determine a failure or a recovery has occurred in the ring network; and the central control unit is configured to control the port control unit, based on the determination, to change the one or more ports to either a forwarding state or a blocking state. In another example, the determination unit is further configured to determine whether the source address of the received data messages matches the local address of a communication device; and the central control unit is further configured to block the data message from further forwarding based on the determination that the data message is originated from the communication device.

According to another aspect of the invention, there is provided a communication method in a communication device in a ring network comprising: communicating messages to or from other communication devices; referencing the information in the message received from other communication devices and determining whether specific information is contained in that message; and controlling the state of the ports based on the determined result.

In the above aspect, the method further comprises referencing the contents of a control message received from other communication devices and determining whether a failure has occurred in the ring network or whether the ring network has been recovered from a failure; and controlling the port based on the determined result, to change a port into either a forwarding state or a blocking state.

In the above aspect, the method further comprises determining whether the source address of a received data message matches the local address of a communication device; and terminating forwarding of the data message based on the determined result indicating that the data message is originated from the communication device.

BRIEF DESCRIPTION OF THE DRAWINGS

The foregoing aspects and other advantages of this invention will be more readily appreciated as the same becomes better understood by reference to the following detailed description, when taken in conjunction with the accompanying drawings.

DETAILED DESCRIPTION

Reference will now be made in detail to embodiments in accordance with the invention, examples of which are illustrated in the accompanying drawings. In the following detailed description, numerous specific details are set forth in order to provide a thorough understanding of the invention. However, it will be evident to one of ordinary skill in the art that the invention may be practiced without these specific details. In other instances, well known procedures, components, and circuits have not been described in detail as not to unnecessarily obscure aspects of the invention.

Figure 1:
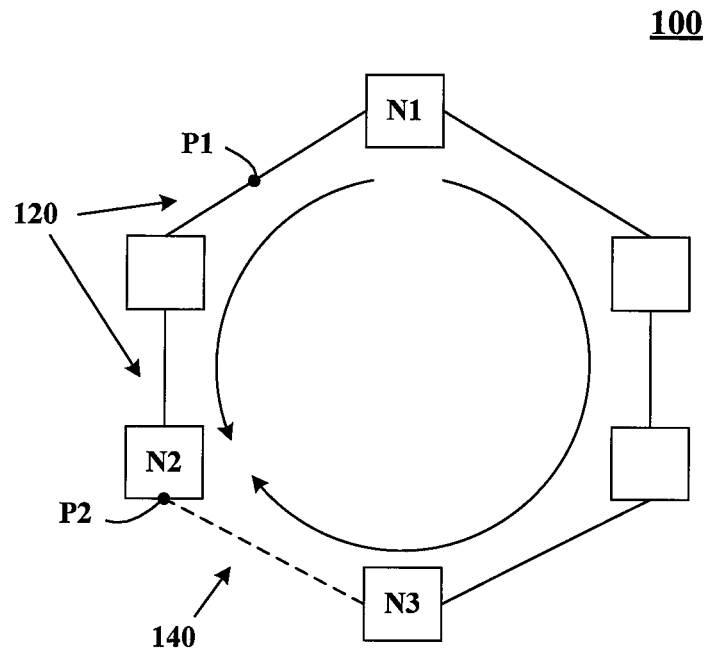
FIG. 1 is an example of a configuration of a typical ring network 100.
Figure 2:
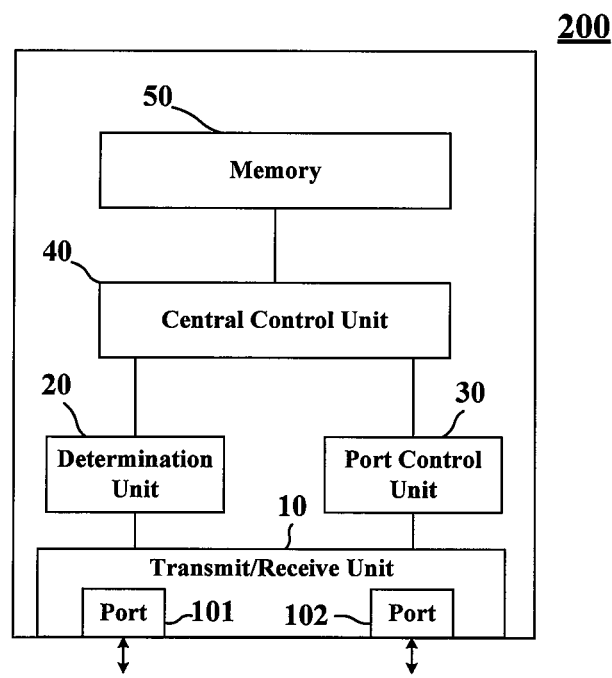
FIG. 2 is a block diagram of an exemplary communication device 200 in accordance with embodiments of the invention.

FIG. 2 is a block diagram of an exemplary communication device 200 in accordance with embodiments of the invention. The communication device 200 includes a transmit/receive unit 10 for communicating messages including control messages and data messages to or from other communication devices; a determination unit 20 for referencing the information in a message received from another communication device through the transmit/receive unit 10 and determining whether specific information is contained in that message; a central control unit 40 for controlling a port control unit 30 based on the determined result from the determination unit 20 or for controlling transmitting/receiving a message through the transmit/receive unit 10; the port control unit 30 for controlling the state of the ports in the transmit/receive unit 10; a memory 50 for storing path information about the mapping relation between Media Access Control (MAC) addresses and ports. It is appreciated that the communication device 200 can be utilized in combination with one or more methods in accordance with embodiments of the invention, described herein, thereby enabling a quicker path switching in the event of a failure in the ring network.

The transmit/receive unit 10 is provided with at least two ports 101 and 102 connected to other communication devices like switches in the ring network. It is to be understood that other ports may be provided in the transmit/receive unit 10 for communicating with other monitoring/computing devices or an external network. The transmit/receive unit 10 is controlled by the port control unit 30, to change each of the ports into either a forwarding state or a blocking state. In the present description, "forwarding state" means a condition in which the port can transfer both control messages and data messages, and "blocking state" means a condition in which the port can transfer only control messages.

The determination unit 20 references the contents of a message received from other communication devices through the transmit/receive unit 10 and determines whether a failure has occurred in the ring network or whether the ring network has been recovered from a failure. The determined result indicative of the status of the ring is sent to the central control unit 40. The determination unit 20 may also be configured to reference the contents of a message received from other communication devices through the transmit/receive unit 10 and determine whether the source address of the received message matches the local address of the communication device 200 in order to filter the message. The determined result indicative of the origin of the message is sent to the central control unit 40. In examples, the message for determining the status of the ring network is a control message, and the message to be filtered is a data message.

The central control unit 40 controls the operation of the port control unit 30 based on the determined result from the determination unit 20. That is, the central control unit 40 controls the port control unit 30, based on the determined result, to change a port into either a forwarding state or a blocking state. The central control unit 40 terminates forwarding a message based on the determined result indicating that the message originated from the local communication device 200.

The port control unit 30 is controlled by the central control unit 40, to control the states of the ports constituting the ring network. That is, the port control unit 50 is controlled by central control unit 40, to change each of the ports of the transmit/receive unit 10 into either a forwarding state or a blocking state. Also, the port control unit 30 can maintain each of the ports in either a forwarding state or a blocking state.

As shown in FIG. 2, the communication device 200 is provided a first port 101 and a second port 102. The communication device 200 can be configured to detect the status of the ring network by periodically transmitting from the first port 101 toward the second port 102 a control message and determining whether the control message transmitted from the first port 101 is received by the second port 102. The communication device 200 can also be configured to filter the message originated by the device itself to avoid an endless loop by comparing the source address of the received message with the local address of the communication device 200.

Figure 3:
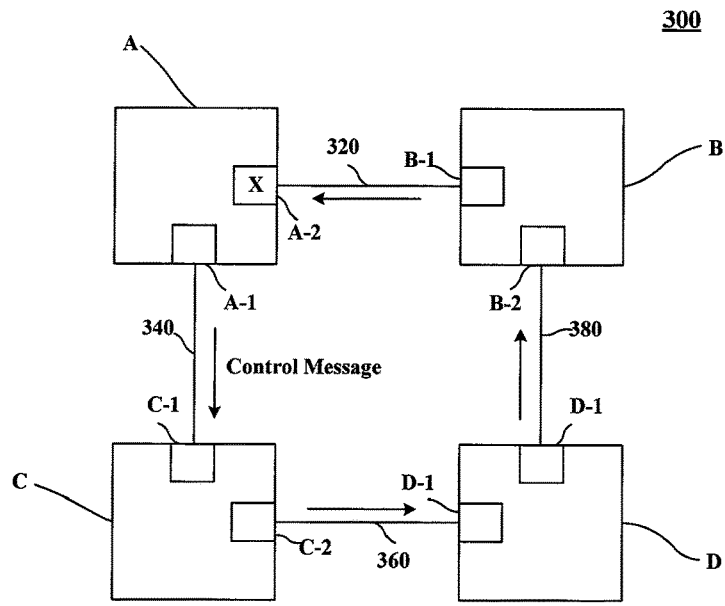
FIG. 3 is a block diagram of an exemplary single ring network 300 in accordance with embodiments of the invention.

FIG. 3 is a block diagram of an exemplary single ring network 300 in accordance with embodiments of the invention. It is appreciated that the single ring network 300 can be utilized in combination with one or more methods in accordance with embodiments of the invention, described herein, thereby enabling a quicker path switching in the event of a failure in the ring network.

The single ring topology 300 includes communication switches A, B, C and D that are coupled in a single ring configuration. Specifically, port A-2 of switch A is coupled to port B-1 of switch B via link 320. Port A-1 of switch A is coupled to port C-1 of switch C via link 340. Port C-2 of switch C is coupled to port D-2 of switch D via link 360. Port B-2 of switch B is coupled to port D-1 of switch D via link 380. One or more of the switches in network 300 may have substantially the same function and configuration of the communication device 200 as described with reference to FIG. 2. It is appreciated that one or more of the switches in network 300 may have at least a partial function of the communication device 200 as described with reference to FIG. 2 as desired in a particular application. It is also appreciated that ring topology 300 can include a greater or fewer number of switches.

In one embodiment, one switch of switches A to D may be selected as a controller switch during ring initialization. The controller switch may also be predetermined before the ring is established. In an example, switch A may be selected as controller switch, and port A-2 may be set in a blocking state as indicated in FIG. 3 by X, whereby one port of switch A is logically blocked. Other switches B, C and D may have both ports in a forwarding state. This configuration formed before or during the ring initialization allows no logical loop although forming a physical loop in ring network 300 and connectivity can be maintained between any two switches. This configuration also allows earlier data communication since switches B, C and D with ports initially set in a forwarding state do not wait for a ring status notification from the controller switch A.

In one embodiment, controller switch A may periodically transmit from the port A-1 toward port A-2 a control message and determine whether the control message transmitted from the port A-1 is received by the port A-2. Upon determination that the control message transmitted from the port A-1 is not received by the port A-2, the controller switch A determines that a failure has occurred and sets the state of port A-2 into a forwarding state. Later, upon determination that the control message transmitted from the port A-1 can be received again by the port A-2, the controller switch A determines that the ring has recovered from the failure and sets the state of port A-2 back to a blocking state.

In another embodiment, at least one of the switches in the ring is configured to filter the message originated by the switch itself to avoid an endless loop, which may occur during the period when the ring network has recovered from failure whereas controller switch A has not yet set the state of port A-2 back to a blocking state.

Figure 4:
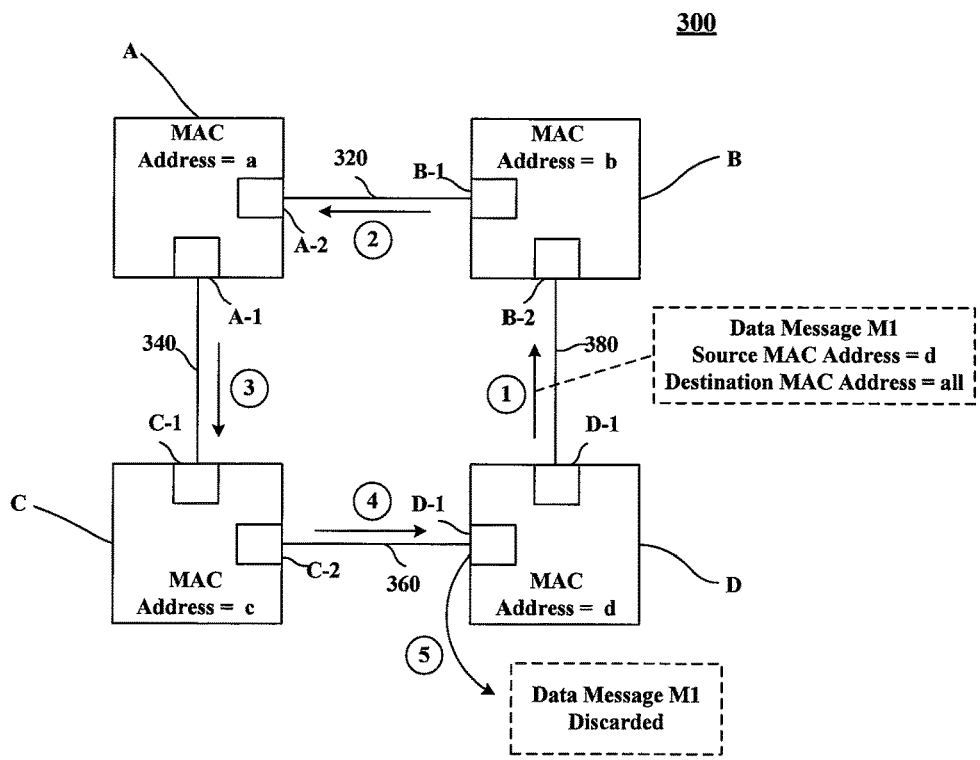
FIG. 4 is a block diagram illustrating an example of message filtering in the single ring network 300 shown in FIG. 3 in accordance with embodiments of the invention.

FIG. 4 is a block diagram illustrating an example of message filtering in the single ring network 300 shown in FIG. 3 in accordance with embodiments of the invention. FIG. 4 shows a situation that all ports of the switches are in a forwarding state. In this example, switch D is configured to filter the data message M1 sent by switch D itself. When switch D with a MAC address of d originates and sends a broadcast data message M1 onto the ring through port D-1, date message M1 will have a MAC source address=d and a MAC destination address=all. Data message M1 will be forwarded around the ring network in sequence indicated by the numbers in circles of FIG. 4. Upon receiving data message M1 at port B-2, switch B will proceed to forward the message to other ports when it determines that the source MAC address d of the message does not match the local MAC address b of switch B. When data message M1 arrives back at the originating switch D at port D-2, switch D determines that the message has a MAC source address d that matches the local MAC address d. The data message M1 will then be discarded as indicated by number 5 in a circle. As a result, data message M1 has been routed to every switch but discarded when returned to the originating switch D. Therefore, switch D may prevent the data message M1 from continuing to be forwarded in an infinite loop.

It is to be understood that two or more of the switches in the ring network 300 may be configured to filter messages originated by the switch itself. The operation described with respect to FIG. 4 applies to other switches.

Figure 5:
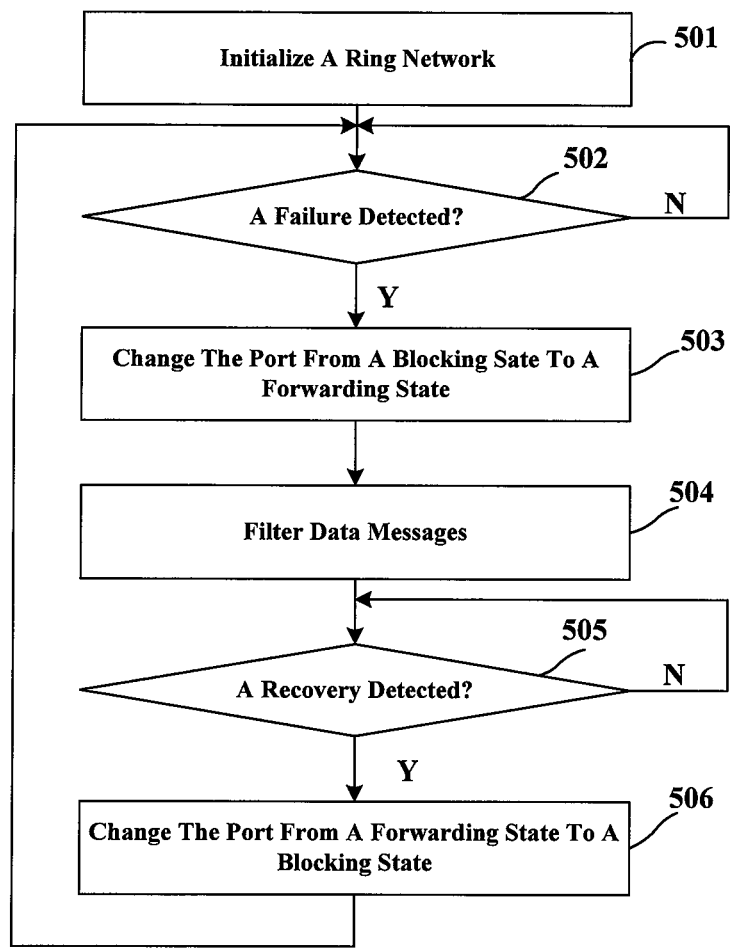
FIG. 5 is a flowchart of a communication method 500 in accordance with embodiments of the invention.

FIG. 5 is a flowchart of a communication method 500 in accordance with embodiments of the invention. Method 500 includes exemplary processes of an embodiment of the invention, which can be carried out by a processor under the control of instructions executable on an electronic device. The instructions may reside, for example, in a volatile memory or non-volatile memory of an electronic device. Although specific operations are disclosed in method 500, such operations are exemplary. That is, method 500 may not include all of the processes illustrated by FIG. 5. Rather, method 500 may include various other processes and/or variations of the processes. Likewise, the sequence of the processes of method 500 can be modified. It is appreciated that the processes of method 500 can each be performed by software, firmware, electronic hardware, or any combination thereof.

In process 501 of method 500, a ring network is initialized. The ring network including a plurality of communication nodes may be a single ring network. A communication node may be provided with a first port and a second port each coupled to a first port or a second port of an adjacent communication node so as to form a ring topology along with other communication nodes, as shown for example in FIG. 3. During the initialization of the ring network, one of the nodes may be configured to be the controller node. Alternately, one of the nodes may be selected as a default controller node before the ring network is initialized. Once a controller node is decided, one of its ports is logically blocked so that generation of a loop is prevented. In one embodiment, during the initialization, nodes other than the controller node are configured to have both ports in a forwarding state.

In process 502, a determination can be made in the controller node as to whether a link and/or node failure is detected within the ring topology. If a failure is not detected in process 502, method 500 proceeds to the beginning of process 502. If a failure is detected in process 502, method 500 proceeds to process 503. In an example, the controller node may transmit periodically from the first port toward the second port a control message and determine whether the control message transmitted from the first port is received by the second port. The controller node determines that a failure is detected if the second port fails to receive the control message transmitted from the first port. The control message may be communicated using Bridge Protocol Data Unit (BPDU). In an example, when a 10 Mbps Ethernet cable is used, the detecting of status of the ring network can be performed by a link pulse exchanged in a physical layer. In an example, a BPDU message is sent periodically from the first port toward the second port at a microsecond level. In an example, a BPDU message is sent from a driver layer.

In process 503, the controller node changes a port that had been blocked into a forwarding state in response to a detection of a failure of the ring network. For example, node A in ring network 300 changes port A-2 from a blocking state as shown in FIG. 3 to a forwarding state as shown in FIG. 4 when node A determines that a failure has occurred. A new data communication path is therefore established by using the backup path between port A-2 of node A and port B-1 of node B.

In process 504, one or more nodes may be configured to filter the message sent by the node itself to avoid an endless loop in any case. In an example, process 504 is performed by all nodes in the ring network. In another example, process 504 is performed by all nodes except the controller node. In another example, process 504 is performed only in the controller node. As discussed above, message filtering may be implemented by comparing the source address of the received message from another node with the local address of the present node. It is to be understood that the source address and the local address include but are not limited to a MAC address. Alternately, another address such as an Internet Protocol (IP) address can be used to identify the originating node from which the message is sent.

Note that the process 504 is not limited by the sequence shown in FIG. 5. Rather, process 504 may be executed anytime during method 500 and may run independently for a period of time.

In one embodiment, as shown in FIG. 5, process 504 begins after the controller unblocks one of its ports and runs for a period of time. Referring back to FIG. 4, it is noted that all ports of the nodes in ring network 300 may be in a forwarding state after node A unblocks port A-2. Though a loop will not be generated during the failure of the ring network, it may occur when the ring recovers while node A has not yet blocked port A-2. In this embodiment, node D may be configured to filter the message as shown in FIG. 4. As such, node D will not be the cause of an endless loop. In a preferred embodiment, all nodes in the ring network are configured to filter data messages.

In process 505, a determination can be made in the controller node as to whether a link and/or node recovery is detected within the ring topology. If a recovery is not detected in process 505, method 500 proceeds to the beginning of process 505. If a recovery is detected in process 505, method 500 proceeds to process 506. Similar to the description regarding process 502, the controller node may transmit periodically from the first port toward the second port a control message and determine whether the control message transmitted from the first port is received by the second port. The controller node determines that a recovery is detected if the second port receives the control message transmitted from the first port.

In process 506, the controller node changes the port from a forwarding state to a blocking state in response to a detection of a recovery of the ring network. Therefore, with processes in method 500, path switching in the event of a failure can be accomplished quickly and safely.

Figure 6:
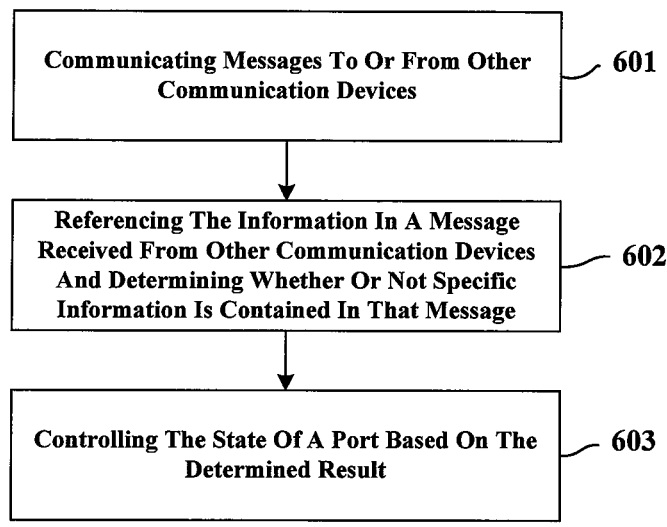
FIG. 6 is a flowchart of a communication method 600 in a communication device in accordance with embodiments of the invention.

FIG. 6 is a flowchart of a communication method 600 in a communication device in accordance with embodiments of the invention. Method 600 includes exemplary processes of an embodiment of the invention, which can be carried out by a processor under the control of instructions executable on an electronic device. Processes in method 600 are implemented in a communication device configured in a ring network. In process 601, communicating messages to or from other communication devices occurs. In process 602, referencing the information in a message received from other communication devices and determining whether specific information is contained in that message occur. In process 603, controlling the state of a port based on the determined result occurs. Alternately, in process 603, forwarding of a message is controlled based on the determined result. It is appreciated that controlling the state of a port and controlling the forwarding of a message may be performed independently or simultaneously in process 603.

In one embodiment, in process 602, contents of a control message received from other communication devices is considered to determine whether a failure has occurred in the ring network or whether the ring network has been recovered from a failure. Then, in process 603, the determined result is used to change a port into either a forwarding state or a blocking state.

In another embodiment, in process 602, contents of a control message received from other communication devices are considered to determine whether a data message originated from the communication device. Then, in process 603, the determined result is used to terminate forwarding of the data message.

Figure 7:
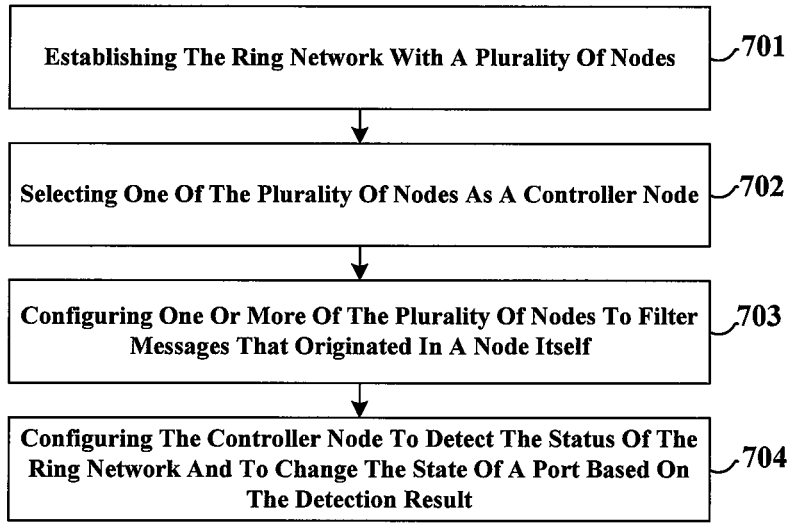
FIG. 7 is a flowchart of a method 700 for configuring a communication system in a ring network in accordance with embodiments of the invention.

FIG. 7 is a flowchart of a method 700 for configuring a communication system in a ring network in accordance with embodiments of the invention. As shown in FIG. 7, configuring a communication system in a ring network comprises a process 701 of establishing the ring network with a plurality of nodes; a process 702 of selecting one of the plurality of nodes as a controller node; a process 703 of configuring one or more of the plurality of nodes to filter messages that originated in a node itself; and a process 704 of configuring the controller node to detect the status of the ring network and to change the state of a port based on the detection result.

The techniques presented above are exemplary. Many of the functions described above can be performed in multiple ways other than those described, as will be apparent to those familiar with the art after reading this description. Some nodes may have functionality that allows them to perform particular functions more efficiently or in a different order than in the manner described. Although embodiments have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the claims.

What is claimed is:

1. A communication method comprising:
   configuring a ring network with a plurality of nodes, wherein one of the plurality of nodes acts as a master node;
   determining for each of the plurality of nodes whether a counterclockwise path or a clockwise path from the master node has a lower cost;
   identifying an unnecessary path between a first adjacent node and a second adjacent node, where the first adjacent node has a lower cost on the clockwise path and the second adjacent node has a lower cost on the counterclockwise path;
   blocking a clockwise port on the first adjacent node and a counterclockwise port on the second adjacent node that correspond to the unnecessary path, where to block a port refers to placing a port in a blocking state where the port transfers control message but not data messages;
   receiving data messages at a specified one of a plurality of communication devices the ring network and detecting a status of the ring network;
   changing a port of the specified communication device from a blocking state to a forwarding state in response to the data messages indicating a failure in the ring network or detecting a failure in the ring network;
   filtering and forwarding the received data messages in the ring network, wherein the received data messages that originated from the specified communication device are blocked from further forwarding at the specified communication device; and
   changing the port of the specified communication device from the forwarding state to the blocking state in response to detecting a recovery of the ring network,
   wherein detecting the status of the ring network comprises:
     periodically transmitting a control message from a first port of the specified communication device toward a second port of the specified communication device via the ring network;
     detecting the failure in the ring network in response to the second port failing to receive the control message transmitted from the first port; and
     detecting the recovery of the ring network in response to the second port receiving the control message transmitted from the first port via the ring network.

2. The communication method of claim 1, wherein filtering the received data messages comprises, for each received data message:

comparing a source address of the received data message with a local address of the specified communication device; and
blocking the received data message in response to determining that the source address of the received data message matches the local address of the specified communication device.

3. The communication method of claim 2, wherein each of the source addresses of the received data messages and the local address of the specified communication device comprises a Medium Access Control (MAC) address or an Internet Protocol (IP) address.

4. The communication method of claim 1, wherein filtering the received data messages comprises filtering the received data messages in all of the communication devices.

5. The communication method of claim 1, wherein filtering the received data messages occurs after the port of the specified communication device is unblocked and until the recovery of the ring network is detected.

6. The communication method of claim 1, further comprising:
selecting the specified communication device as a master node for the ring network; and
changing the port of the specified communication device to the blocking state in response to the specified communication device being selected as the master node.

7. A communication device comprising:
at least one processor configured to:
configure a ring network with a plurality of nodes, wherein one of the plurality of nodes acts as a master node;
determine for each of the plurality of nodes whether a counterclockwise path or a clockwise path from the master node has a lower cost
identify an unnecessary path between a first adjacent node and a second adjacent node, where the first adjacent node has a lower cost on the clockwise path and the second adjacent node has a lower cost on the counterclockwise path;
block a clockwise port on the first adjacent node and a counterclockwise port on the second adjacent node that correspond to the unnecessary path, where to block a port refers to placing a port in a blocking state where the port transfers control message but not data messages;
communicate messages to or from other communication devices in the ring network, a transmit/receive unit comprising multiple ports;
obtain received data messages from the transmit/receive unit;
detect a status of the ring network;
change a specified one of the ports from a blocking state to a forwarding state in response to detecting a failure in the ring network;
filter and forward the received data messages in the ring network, wherein the at least one processor is configured to block the received data messages that originated from the communication device from further forwarding; and
change the specified port from the forwarding state to the blocking state in response to detecting a recovery of the ring network,
wherein the at least one processor is configured to detect the status of the ring network by:
periodically initiating transmission of a control message from a first of the ports toward a second of the ports via the ring network;
detecting the failure in the ring network in response to the second port failing to receive the control message transmitted from the first port; and
detecting the recovery of the ring network in response to the second port receiving the control message transmitted from the first port via the ring network.

8. The communication device of claim 7, wherein the at least one processor is configured to filter the received data messages by, for each received data message:
comparing a source address of the received data message with a local address of the communication device; and
blocking the received data message in response to determining that the source address of the data message matches the local address of the communication device.

9. The communication device of claim 8, wherein each of the source addresses of the received data messages and the local address of the communication device comprises a Medium Access Control (MAC) address or an Internet Protocol (IP) address.

10. The communication device of claim 7, wherein the at least one processor is configured to filter the received data messages after the specified port is unblocked and until the recovery of the ring network is detected.

11. The communication device of claim 7, wherein:
the communication device is configured to be selected as a master node for the ring network; and
the at least one processor is configured to change the specified port to the blocking state in response to the communication device being selected as the master node.

12. The communication device of claim 7, wherein the at least one processor is configured to communicate messages to or from only two other communication devices in a single-ring network.

13. The communication device of claim 7, wherein the communication device comprises a switch.

14. A communication device comprising:
at least one processor configured to:
configure a ring network with a plurality of nodes, wherein the communication device acts as a master node;
determine for each of the plurality of nodes whether a counterclockwise path or a clockwise path has a lower cost
identify an unnecessary path between a first adjacent node and a second adjacent node, where the first adjacent node has a lower cost on the clockwise path and the second adjacent node from the master node has a lower cost on the counterclockwise path;
block a clockwise port on the first adjacent node and a counterclockwise port on the second adjacent node that correspond to the unnecessary path, where to block a port refers to placing a port in a blocking state where the port transfers control message but not data messages;
communicate messages to or from other communication devices in the ring network;
determine reference information in the messages received from the other communication devices whether specified information is contained in the messages; and
control one or more states of one or more ports based on the specified information contained in the messages.

15. The communication device of claim 14, wherein the at least one processor is further configured to:

reference contents of a control message received from at least one of the other communication devices and to determine whether a failure or a recovery has occurred in the ring network; and control the one or more states of the one or more ports, based on the determination, to change each of the one or more ports to either a forwarding state or a blocking state.

16. The communication device of claim 14, wherein, for each received data message, the at least one processor is further configured to:

determine whether a source address of the received data message matches a local address of the communication device; and block the received data message from further forwarding based on a determination that the received data message originated from the communication device.

17. The communication device of claim 14, wherein the communication device comprises a switch.

18. A communication system comprising at least one communication device according to claim 14.

* * * * *